(12) United States Patent
Atkinson

(10) Patent No.: US 7,535,417 B2
(45) Date of Patent: May 19, 2009

(54) ENHANCING TIME KEEPING ACCURACY FOR LOW POWER GPS RECEIVERS

(75) Inventor: Chris Atkinson, Bedfordshire (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/631,356

(22) PCT Filed: Jun. 30, 2004

(86) PCT No.: PCT/IB2004/002163

§ 371 (c)(1),
(2), (4) Date: Aug. 6, 2007

(87) PCT Pub. No.: WO2006/010976

PCT Pub. Date: Feb. 2, 2006

(65) Prior Publication Data

US 2007/0285309 A1    Dec. 13, 2007

(51) Int. Cl.
*G01S 1/00* (2006.01)
(52) U.S. Cl. .................. 342/357.12; 342/357.1
(58) Field of Classification Search ........... 342/357.06, 342/357.1, 357.12, 358, 357.15
See application file for complete search history.

(56) References Cited

U.S. PATENT DOCUMENTS

| 5,592,173 | A | 1/1997 | Lau et al. .................... 342/357 |
| 5,596,333 | A * | 1/1997 | Bruckert ..................... 342/457 |
| 5,893,044 | A * | 4/1999 | King et al. ............. 342/357.12 |
| 6,236,839 | B1 * | 5/2001 | Gu et al. ..................... 342/359 |
| 6,438,381 | B1 * | 8/2002 | Alberth, Jr. et al. .... 342/357.06 |
| 6,901,330 | B1 * | 5/2005 | Krull et al. ............ 342/357.06 |
| 2003/0040869 | A1 | 2/2003 | Nir et al. ..................... 701/214 |
| 2003/0112179 | A1 * | 6/2003 | Gronemeyer .......... 342/357.15 |
| 2004/0209625 | A1 | 10/2004 | Haddrell |
| 2004/0225439 | A1 * | 11/2004 | Gronemeyer ............... 701/213 |

FOREIGN PATENT DOCUMENTS

| GB | 2 394 134 A | 4/2004 |
| WO | WO 03/029836 A2 | 4/2003 |

* cited by examiner

*Primary Examiner*—Thomas H Tarcza
*Assistant Examiner*—Fred H Mull
(74) *Attorney, Agent, or Firm*—Harrington & Smith, PC

(57) ABSTRACT

A mobile device including a positioning device for determining position by timing analysis of received signals, the positioning device including a system for determining timing accuracy, the system including first signal generating means for continuously generating a first clock signal whilst the positioning device is inactive, second signal generating means for discontinuously generating a second clock signal during a plurality of spaced apart time periods, and accuracy determining means for determining the accuracy of the first clock signal using timing data from the second clock signal, the positioning device being arranged to determine position by use of the determined timing accuracy of the first clock.

29 Claims, 4 Drawing Sheets

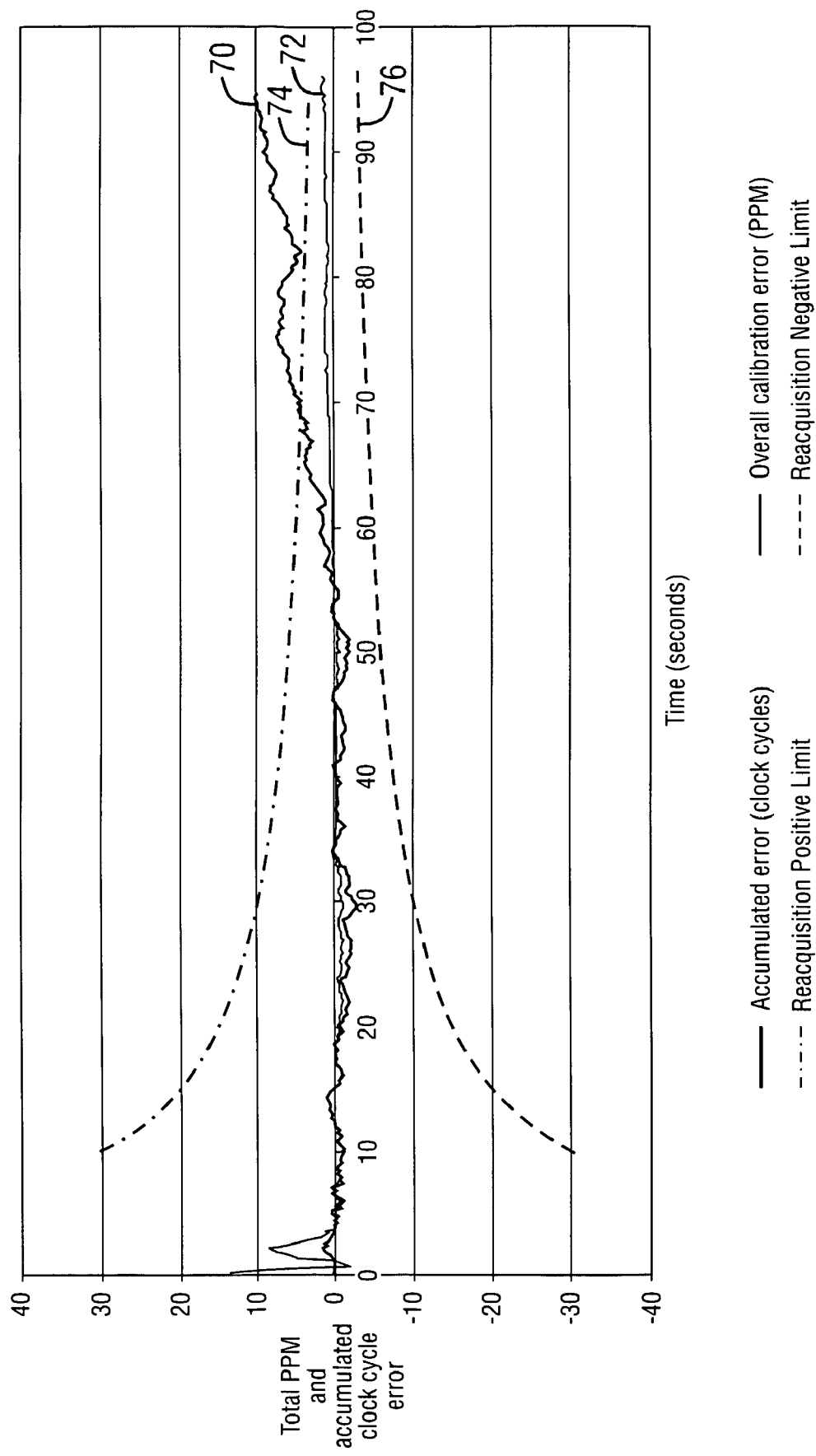
FIG. 4 Clock Calibration Error

ENHANCING TIME KEEPING ACCURACY FOR LOW POWER GPS RECEIVERS

FIELD OF THE INVENTION

The present application relates to enhancing time keeping accuracy and in particular to enhancing time keeping accuracy for low power global positioning system (GPS) receivers used in cellular telephones.

BACKGROUND OF THE INVENTION

In positioning systems based on satellite positioning, a positioning receiver attempts to detect its position based on signals from at least four orbiting satellites, using triangulation techniques. Satellites transmit code division multiple access (CDMA) signals which are received by the receiver. Embedded in each CDMA signal are Pseudo Random Noise (PRN) code sequences 1024 bits in length and transmitted continuously at a rate of 1 Mchip/s. Superimposed upon the PRN code by BPSK modulation (exclusive OR) is telemetry data at 50 bit/s structured in 5 subframes of 300 bits each. A chip is equivalent to one transmitted bit of the PRN code and is 1 microsecond in duration. A data bit is 20 ms in length during which the PRN sequence will have been repeated 20 times. Timing information spanning from carrier phase to PRN bit position down to the edges of the 50 bit/s modulation and subframes that contain ephemeris and other satellite vehicle data, are all precisely timing related and derived from the satellite vehicle's onboard atomic clock.

SUMMARY OF THE INVENTION

Assuming that the precise time and its relationship to the PRN code sequences are known to the earth-based GPS receiver then the shift in time of the received PRN code sequence can be used to determine the radio frequency (RF) propagation delay or time of flight which can be used to calculate the distance between the satellite and the receiver simply by multiplying this by the speed of light. Since the satellites position as a function of GPS time is transmitted in the 50 bit/s telemetry, precise orbital position at any instant in time can be calculated provided the receiver also knows precise GPS time.

If three satellites' x, y and z co-ordinates are combined mathematically then in theory it is possible to determine the location of the GPS receiver through triangulation techniques. This assumes that the GPS receiver knows precise GPS time synchronised to the satellite atomic clocks. Because cost and size prohibit the use of such highly accurate time references in a mobile handset, a fourth satellite measurement is taken by the GPS receiver which allows time to be solved as another variable along with x, y and z variables in four simultaneous equations. The result of the solution of these equations is a position fix and GPS time known to sub-microsecond accuracy. Precise time is therefore a product of obtaining a position fix.

If further position fixes are required, then the precise time must be accurately maintained. An internal clock signal of the position receiver is used to determine the time elapsed since the previous fix. If there is inaccuracy in the clock signal, then depending on the size of the inaccuracy resynchronisation to the nearest bit edge or even frame edge of the telemetry data may be required before another position fix can take place. This can be very costly in terms of the time and energy required for this re-acquisition. Furthermore, in low signal areas such as in buildings or a dense forest, a time error of greater than 0.5 ms could mean an inability to maintain tracking because of the higher signal strength needed to determine the position of the bit edges.

Reducing the power consumption of positioning devices is a major concern of designers, particularly if a GPS receiver is to be incorporated in a mobile telephone. Lower power consumption means that a smaller battery may be used, and therefore the smaller and lighter the mobile phones can be designed.

Some GPS receivers keep a highly accurate system clock running for maintaining GPS time between fixes but its high frequency means that the oscillator alone will account for current consumption in the range of milliamps and this could easily be for 95% of the time for navigation and location based applications. This is clearly undesirable due to the amount of energy used, and therefore the battery size required.

Generally the RTC (real time clock) oscillator used in a GPS receiver would be derived from a 32768 Hz tuning fork type crystal operating continuously within the cellular engine and is often referred to a Sleep clock since it is often the only clock running in the sleep state of the cellular engine. It will have been selected because of its low power consumption and that it operates continuously, however there is one major drawback in that such low frequency crystals can typically vary in frequency by 3 ppm (parts per million) per degree temperature change and have a ±20 ppm initial error. A temperature change between fixes such as this could be expected due to the cellular RF power amplifier or battery charging circuitry in the cellular terminal, and could therefore mean in the worst case scenario that the GPS engine fails to re-acquire the satellite signals. The best-case scenario would be that the cellular engine informs the GPS engine of a potential increased time keeping error based on its knowledge that the change in operating mode will cause a temperature change. The terms 'cellular engine' and 'GPS engine' are used throughout this application to refer to the active electronics, including any operating software, of a cellular telephone and GPS receiver respectively. The GPS receiver can then widen its time bin search accordingly however this will take longer and consume more power.

Typical application examples could be keeping track of the location of friends in a crowded place or navigation involving outdoor activities in which location will be changing slowly. Such applications may require a position fix every few minutes, which places the greatest demands upon time keeping since a temperature change due to making a call could cause a 70 ppm shift in the RTC oscillator.

It is an aim of embodiments of the present invention to at least partially address one or more of the above issues.

According to one embodiment of the present invention a mobile device is provided comprising a positioning device for determining position by timing analysis of received signals, the positioning device comprising a system for determining timing accuracy, the system comprising: first signal generating means for continuously generating a first clock signal whilst the positioning device is inactive; second signal generating means for discontinuously generating a second clock signal during a plurality of spaced apart time periods; and accuracy determining means for determining the accuracy of the first clock signal using timing data from the second clock signal; the positioning device being arranged to determine position by use of the determined timing accuracy of the first clock.

BRIEF DESCRIPTION OF THE DRAWINGS

For a better understanding of the present invention and as to how the same may be carried into effect, reference will now be made by way of example only to the accompanying drawings in which:

FIG. 4 shows a graph illustrating accumulated clock error, and overall calibration error.

DETAILED DESCRIPTION OF THE INVENTION

Embodiments of the present invention will now be described in the context of a GPS positioning device incorporated in to a mobile phone. It will however be apparent that the present invention is applicable to any positioning system in a mobile device where accurate time data is required for position fixing, or high clock accuracy is required. Furthermore, embodiments of the present invention are described in the context of a mobile device operating the Global System for Mobile Communications GSM standard, however the present invention could equally be incorporated in a mobile device using different cellular air interfaces such as Time Division Multiple Access TDMA in a TDMA network, Code Division Multiple Access CDMA in a CDMA network, or Personal Digital Cellular PDC in a PDC network.

Figure 1:
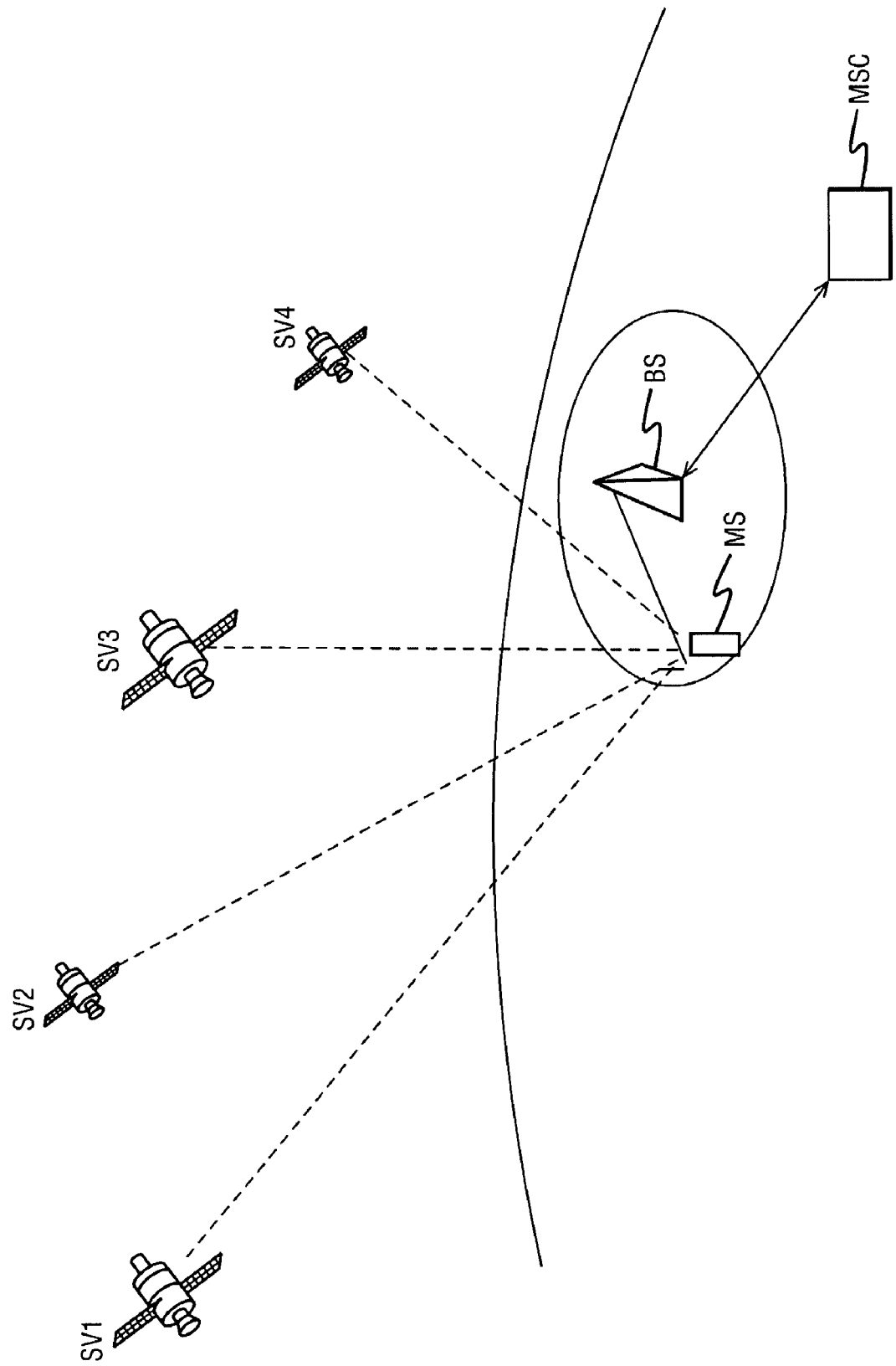
FIG. 1 illustrates an overview of a GPS system.

FIG. 1 illustrates an overview of a global position system wherein a mobile device MS has a built in GPS receiver which is able to determine its position based on CDMA signals received from four satellites SV1, SV2, SV3 and SV4. In the embodiment of FIG. 1 the mobile device MS is a mobile wireless communication device which has access to a global system for mobile communications GSM based telecommunications network via a wireless connection to a base station BS which is connected to a mobile switching centre MSC. In the GPS system, the satellites transmit time data as well as ephemeris data, on the basis of which the positioning device within the mobile device can perform calculations to determine its position and the precise time. The ephemeris data and time data are transmitted on CDMA signals in frames (not shown in the appended figures) which are further divided into subframes. In the GPS system, each frame comprises 1500 bits which are divided into five subframes of 300 bits each. Since the transmission of one bit takes 20 ms, the transmission of each subframe will thus take 6 s, and the whole frame will be transmitted in 30 seconds.

In order to detect satellite signals and identify satellites the receiver must perform acquisition, whereby the receiver searches for the CDMA signal from each satellite, and attempts to lock on to this signal so that the information transmitted with the signal can be received and demodulated.

The positioning device has two primary functions:
1. to calculate the pseudo range between the receiver and different GPS satellites; and
2. to determine the position of the receiver by utilizing the calculated pseudo ranges and the position data of the satellites. The position data of the satellites at each time can be calculated on the basis of the ephemeris and time correction data received from the satellites.

The distances to the satellites are called pseudo ranges, because the time is not accurately known in the receiver. Thus, the determinations of position and time are iterated until a sufficient accuracy is achieved with respect to time and position. Because the time is not known with absolute precision, the position and the time must be determined e.g. by linearizing a set of equations for each new iteration.

Once a fix is obtained the GPS receiver can turn off all power consuming circuitry except for that needed for accurate time keeping and some data storage.

As explained above, if accurate timing is not maintained between fixes, re-acquisition can be required. Re-acquisition (Hot Start) performance can vary significantly both in terms of time and energy usage depending on how well time is maintained in between fixes. If timing is maintained with better than ±511 chips (±0.5 ms) accuracy, then the receiver will have maintained synchronisation with the 20 ms wide (=50 bps) bit edges of the telemetry data needing only to correct its current position within the Pseudo Random Noise PRN code sequence to match that of the satellite. The GPS receiver has matched filters where an exact replica of the satellite PRN code is compared against the PRN code received from the satellite. The internal PRN code in the GPS receiver is shifted or rotated bit by bit and when this and the received PRN code are aligned a detectable energy pulse is generated by the matched filter, indicating that correlation has occurred. If up to ±10 ms (±half of 1 bit) accuracy is maintained, then the positioning device would be required to resynchronise to the nearest bit edge. With greater than ±10 ms error in timing, the positioning device would be required to perform frame re-synchronisation which could mean receiving up to 6 seconds or 300 bits of data (=1 sub frame). Currently, position receivers on the market are rarely able to maintain adequate clock accuracy to maintain ±0.5 ms timing accuracy or better without consuming high levels of energy.

It is desirable to minimise energy usage in GPS receivers, particularly those that are incorporated into mobile devices, as this reduces the size of the battery required, and therefore the weight of the device, or alternatively this allows improved battery life between battery charges for the same sized battery. Therefore, the maintenance of time between fixes must also involve low energy usage. One solution would be to keep the highly accurate system clock running, and to turn off all power consuming circuitry such as system clocks and processors, however the high frequency of the oscillator would mean that for a battery powered GPS equipped phone more energy is consumed in sleep mode maintaining time than would be consumed providing location fixes.

Embodiments of the present invention aim to achieve high levels of time keeping accuracy by continuous calibration using the highly accurate cellular system clock. A 32 kHz sleep clock is maintained continuously. When the mobile device is switched on but not in a call (this is called standby mode) the cellular system clock comes on periodically for only for a few milliseconds while cellular paging information is received from the cellular network. This may occur, for example, around about every 230 ms, and have a duration of around 580 µs. This is too short for a sufficiently accurate one-off calibration of the 32 kHz real time clock however embodiments of the present invention utilise every active period of the cellular system clock so as to build up a moving calibration profile that will track any changes in the 32 KHz clock frequency relative to the cellular clock. The GPS engine can be in any mode but would normally sleep to conserve power while the clock calibration hardware runs as a continuous process, achieving increasing precision with time until the result is needed. The result is a numerical value that expresses the average period of each 32 KHz clock cycle in terms of the cellular system clock period from which the GPS engine uses to calculate elapsed time since the previous precise time calculation.

Figure 2:
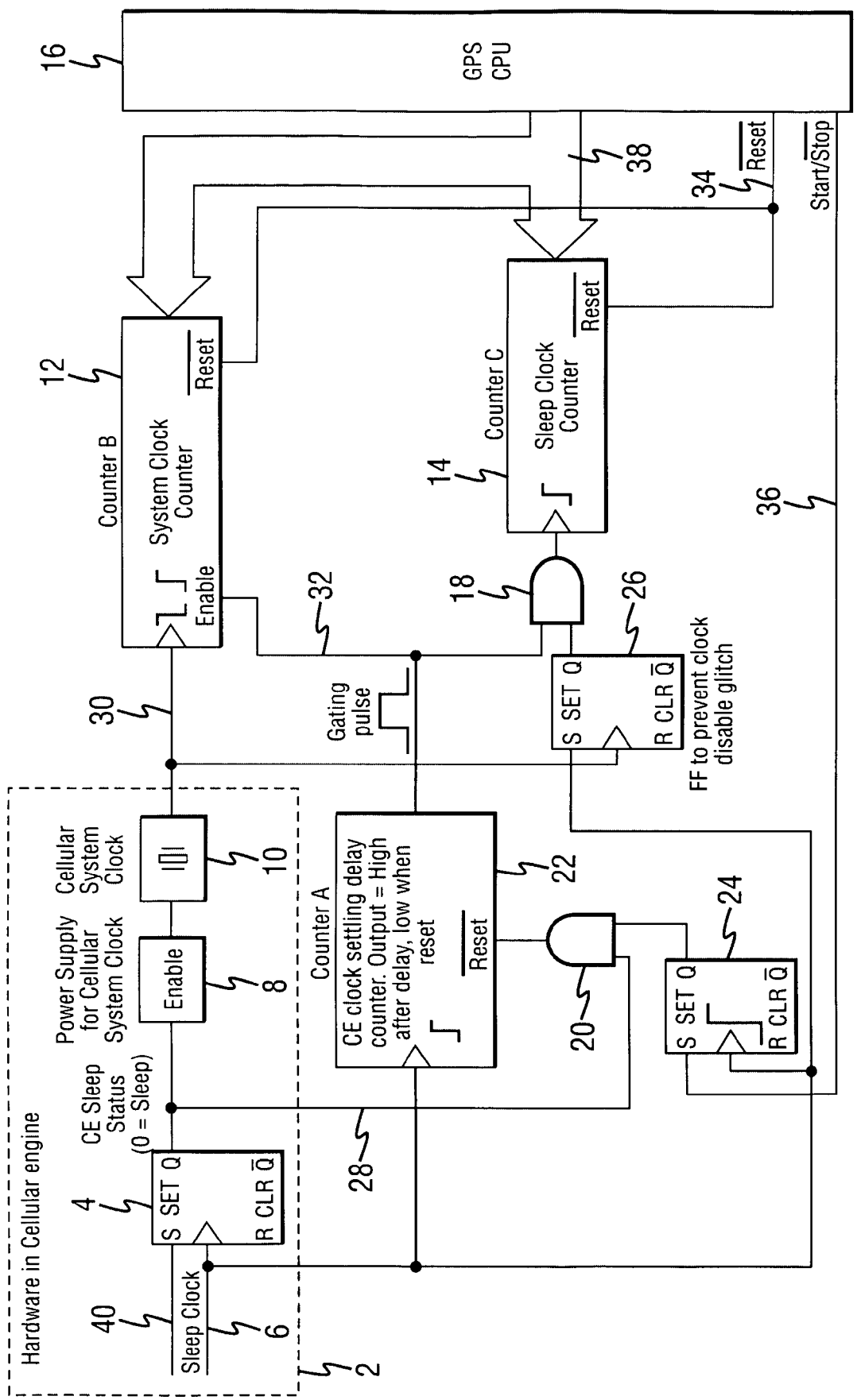
FIG. 2 shows circuitry for enhancing timing accuracy in a positioning device.

Reference will now be made to FIG. 2, which shows one embodiment of circuitry incorporated into the positioning device MS of FIG. 1 for maintaining precise time. The circuitry comprises a Cellular Engine 2, Counters A, B and C labelled 22, 12 and 14 respectively, and a GPS central processing unit CPU 16. The Cellular Engine 2 in FIG. 2 comprises a first set reset SR flip-flop 4 which is clocked by a sleep clock 6 and receives its 'set' input from the sleep status indicator on line 40. The same clock (not shown in FIG. 2) is used by cellular engine RTC logic to maintain real time (the RTC, real time clock) and sleep timing (the sleep clock 6). Cellular Engine Hardware 2 further comprises a power supply 8 and a cellular system clock 10. The power supply 8 to the cellular system clock is enabled by the Cellular Engine (CE) Sleep status signal which is received from the 'Q' output of the first SR flip-flop 4.

Counter A, labelled 22, counts the rising edges of the sleep clock signal received at its input on line 6. Counter A provides a gating pulse at its output with leading and trailing edges synchronous to the rising edges of the sleep clock. There is a delay on the leading edge of the gating pulse after the leading edge of the sleep status indicator, and this delay is set to the stabilisation time of the cellular reference clock. The trailing edge of the gating pulse is synchronous to the trailing edge of the sleep status indicator unless overridden by the controlling microprocessor (on line 36) to pause the calibration count as will now be explained. The gating pulse is used to enable counters B and C, labelled 12 and 14 respectively, which are the calibration counters used for calibrating the sleep clock. The gating pulse is provided on line 32 to the enable input of Counter B. It is also provided to one input of a first two-input AND gate 18, the output of which is connected to the input of counter C. Counter A is reset by the output signal from a second two-input AND gate 20.

Counter B, when enabled, counts both the leading and trailing edges of the output from the cellular system clock 10, which is provided to counter B on line 30. As explained above, counter B is enabled by the gating pulse from counter A, and only counts whilst this signal is high. Counter B further comprises a reset signal input which is received on line 34 from GPS CPU 16, and a control input which allows the GPS CPU 16 to read the count value on line 38.

Counter C counts the leading edges of the sleep clock, which is provided via the first AND gate 18 when the gating pulse in high, and also via a second SR flip-flop 26 which prevents clock disable glitch. SR flip-flop 26 inserts a necessary delay between the Sleep clock 6 and the AND gate 18 that gates sleep clock pulses to counter C under the control of counter A gating pulse. Without this delay a rising Sleep clock edge would propagate through to counter C before the gating pulse trailing edge from counter A has disabled it resulting in an erroneous increment of counter C. This is because the gating pulse edges are also synchronous to rising edges of sleep clock and the same edge also clocks counter C. This SR flip-flop is clocked by the system clock and its 'Q' output is connected to the second input of AND gate 18.

GPS CPU 16 may reset Counter B and C via the reset signal on line 34. It may also read count values via the control line 38 from each of the counters B and C. Furthermore, GPS CPU 16 may reset counter A via start/stop calibration line 36, which is connected to the 'set' input of a third SR flip-flop 24. This third flip-flop is clocked by the sleep clock, and has its output connected to one input of the second AND gate 20. The other input of the second AND gate is connected to the Cellular Engine sleep status signal from the output of the first SR flip-flip 4. Thus counter A is only active when both the sleep status signal on line 28 and the start/stop signal on line 36 are high, otherwise it is reset.

The sequence of operation of the circuitry in FIG. 2 will now be described in the order in which events occur:

1. GPS engine acquires precise GPS time from obtaining a position fix. A snapshot of its own real time clock RTC counter value and corresponding GPS time is retained in memory.
2. RTC calibration start/stop control on line 36 is set to start (high) after resetting the calibration counters A and B.
3. GPS engine enters its sleep period.
4. When the cellular engine next wakes up to receive the paging channel the cellular hardware sets its sleep control signal to '1' on line 40 which enables power from power supply 8 to be provided to the cellular system clock 10. The paging channel is a logical channel transmitted from the base station on a regular basis, and one of its functions is to signal to the mobile device when there is an incoming call.
5. After counter A detects the high sleep signal on line 28, it is no longer in the reset state, and therefore it starts counting sleep clock pulses. After the counter has incremented x counts, it outputs a gating pulse and both the system clock counter B and sleep clock counter C are started on the same rising edge of the sleep clock. The x count value is programmable and allows for the settling period for the cellular system clock. It could be for example 100 clock cycles, if a typical settling time is 3 ms and each sleep clock is 30 us.
6. After a further y counts of the sleep clock, the cellular sleep status indicator signal on line 28 returns to '0' on a rising edge of the sleep clock. The value of the y count is defined according to the sleep clock 6 and will depend on how long the cellular engine is awake. During the Y count counter B counts the cellular system clocks leading and trailing edges and counter C counts the sleep clocks leading edges. The gating output returns to '0' having been reset by sleep status indicator. This stops both the system clock and sleep clock counters as cellular engine enters sleep mode.
7. Steps 4 to 6 are repeated while the cellular engine is in standby mode, and counters B and C will continue to count whilst the gating pulse is high.
8. When a GPS location fix is requested by the cellular engine the RTC calibration start/stop control on line 36 is set to stop (low), causing the gating pulse to go low.
9. Counter B and C values are read by GPS CPU 16 on lines 38.
10. The GPS CPU 16 may then determine the Sleep clock (RTC clock) period. The GPS CPU 16 can use the sleep clock period and the number of periods of the RTC since the previous accurate time calculation to determine the current time. As described in step 1, the snapshot of the sleep clock counter value and corresponding GPS time was retained in memory (not shown in FIG. 2).

Figure 3:
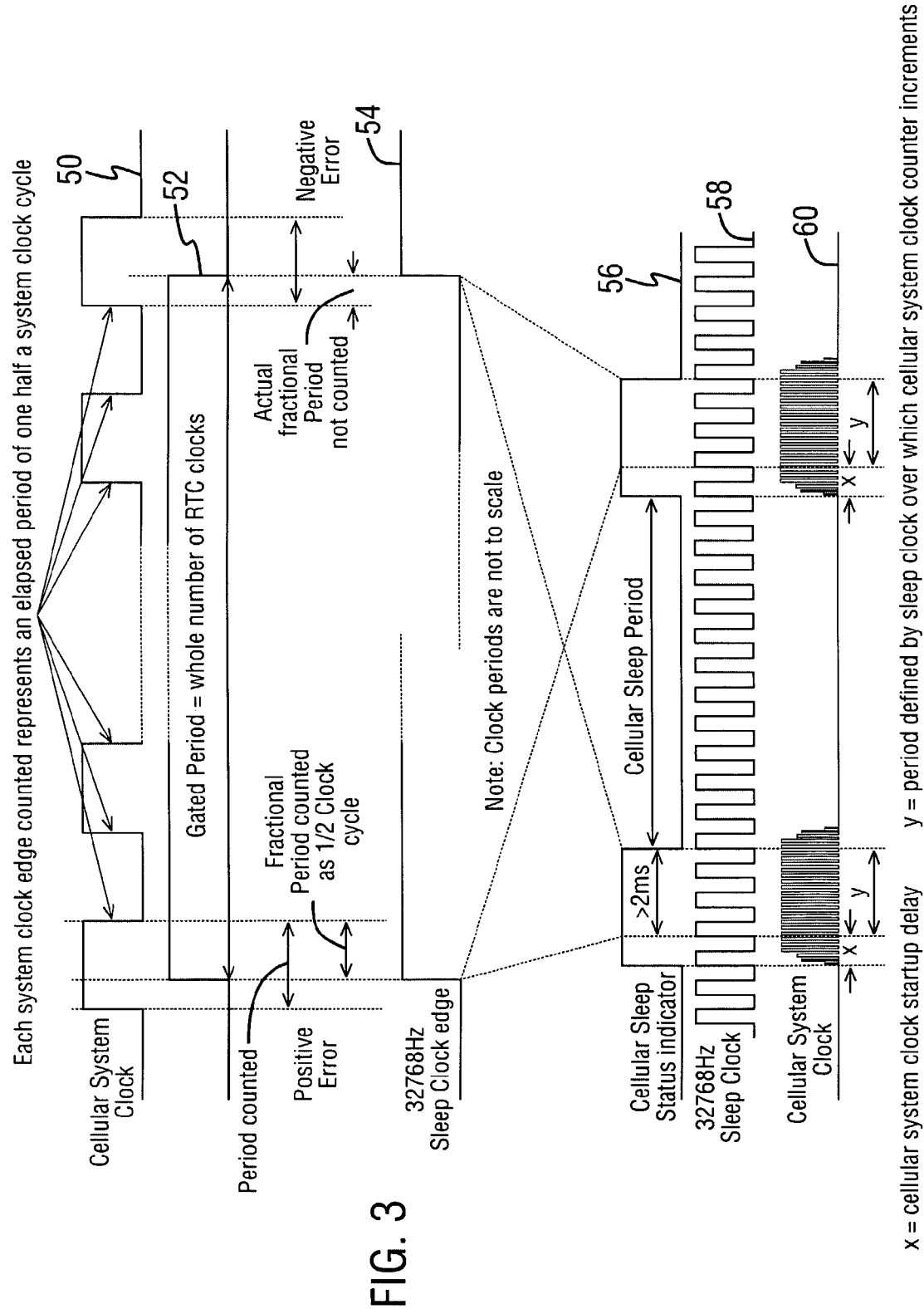
FIG. 3 illustrates an example of clock signals in the positioning device of FIG. 2.

Reference will now be made to FIG. 3 which shows timing signals (not drawn to scale) of the clocks in the embodiment of FIG. 2. The cellular clock signal is shown by the first square wave 50. As shown, the gated pulse 52 output from Counter A of FIG. 2 is clocked by the sleep clock 54, and therefore its leading and trailing edges are not synchronous with the cellular system clock. As described above, each leading and trailing edge of the cellular system clock signal 50 is counted by counter B of FIG. 2, and therefore the error due to the synchronous leading and trailing edge of the gated period is a maximum of half of one clock cycle, which may be positive or negative. The sleep clock (RTC) is shown by wave 54 in FIG. 3, with a frequency of 32768 Hz. In the example shown, the positive error on the leading edge of the gated period is balanced slightly by negative error on the trailing edge. This is key, as due to the normal distribution of the probability of positive or negative error, the average error will tend to zero.

The three wave forms 56, 58 and 60 of FIG. 3 show the sleep status indicator signal (line 28 of FIG. 2), sleep clock and cellular system clock. As shown in this example, after the sleep status indicator signal goes high, there is a period x during which the cellular system clock is starting up, and therefore counters B and C of FIG. 2 are not active. This period is provided by counter A, which only outputs the high gating pulse after x counts, which is a predetermined number of clock edges of the sleep clock. The value of x can be programmed by the GPS CPU 16, and will depend on the time required to start-up the cellular system clock. After the start-up delay, counter B counts the rising and falling edges of the cellular system clock 60 for the period y, and counter C counts the rising edges of the sleep clock 58.

Calculation of the period of the sleep clock will now be explained. The total number of system clock half cycles counted can be read straight from the system clock counter B. The number of corresponding sleep clock cycles counted is read from the sleep counter C. The ratio of the average cellular system clock frequency to the average sleep clock frequency is the ratio of their respective count values taking into account the double edged clocking of the system clock counter. The sleep clock (RTC) period calculation is therefore:

$$T_{RTC} = 0.5 * \frac{N_{ref}}{N_{RTC}} T_{ref}$$

Where $T_{RTC}$ is the period of the sleep clock, $N_{ref}$ is the System clock count, $N_{RTC}$ is the sleep clock count, and $T_{ref}$ is the period of the system clock.

Maximum error per calibration period is $$\text{Error}(ppm) = +/-0.5 * \frac{T_{ref}}{T_{RTC} * N_{RTC}} * 10^6$$

For example, supposing after a position fix the GPS engine enters a sleep period, and is subsequently woken three time before the next fix is required. If the cumulative count of the cellular system clock (which for example is 1 MHz) is 30400, and the cumulative count of the sleep clock (which is 32768 Hz) is 510, using the first formula for the value for the Period $T_{RTC}$, will be (30400*0.5*0.000001)/520=0.0292 ms. Given that the period would be 0.0304 ms if the sleep clock were accurate, this gives an error of 0.676 ms over that period, which would have required the receiver to resynchronise to the 20 ms (50 bits per second) bit edge of the CDMA signal. However, knowing the error, the GPS CPU can adjust the time accordingly. This is by way of example only, and in practice the cellular clock would typically be in excess of 10 MHz.

The table below gives an example of the electrical energy in coulombs used in the circuitry shown in FIG. 2 compared to prior known systems. The values are based on 100 mA active current and a sleep current of either 0.1 mA or 2 mA depending on the clock used for time keeping. The first row shows an example of coulombs used by the embodiment of FIG. 2, which takes advantage of the low power sleep clock calibrated against the high precision cellular clock to achieve the fastest reacquisition time and hence lowest usage of battery charge:

| Time reference during GPS sleep period | Clock drift and time error after 90 seconds | Sleep Current | Reacquisition or Hot start time (GPS Active period) | Coulombs used in GPS sleep | Coulombs used in GPS Active | Total Coulombs used |
|---|---|---|---|---|---|---|
| Calibrated 32768 Hz Sleep clock | 2 ppm = 180 us over 90 sec period | 0.1 mA | 0.2 seconds | 90*0.1 mA = 9 mC | .2*100 mA = 20 mC | 9 + 20 = 29 mC |
| Non-calibrated 32768 Hz Sleep clock | 70 ppm = 6.3 ms over 90 sec period | 0.1 mA | 8 seconds | 90*0.1 mA = 9 mC | 8*100 mA = 800 mC | 9 + 800 = 809 mC |
| GPS system clock | 2 ppm = 180 us over 90 sec period | 2 mA | 0.2 seconds | 90*2 mA = 180 mC | .2*100 mA = 20 mC | 180 + 20 = 200 mC |

FIG. 4 shows a graph of the clock calibration error over time, for a random sample of data. From the graph it can be seen that the accumulated clock cycle errors, labelled 70, vary randomly without any net positive or negative trend as the number of calibration periods increase. The small positive accumulated error of around 10 clock cycles is nothing other than a random bias which should be put into perspective with the total clock cycle count after 94 seconds of just over 8 million. The overall calibration error, shown by line 72 shows a high initial error due to gating but that decreases rapidly to fit well within the requirements for GPS reacquisition which have tightening limits as can be seen bounded by the 2 curves 74 and 76. The calculations are based on reacquisition time needing to be better than ±0.3 ms. It should be noted however, that every simulation run will look different because the input data is random.

The same calibration hardware can be implemented in the cellular engine base-band application specific integrated circuit ASIC to improve the time keeping accuracy of the Real Time Clock. The sleep clock cycle period determined from calibration could be used to calculate a correction factor to the RTC clock correction logic that either adds or subtracts a number of clock cycles every hour.

The application hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A mobile device comprising a positioning device for determining position by timing analysis of received signals, the positioning device comprising a system for determining timing accuracy, the system comprising:
   a first signal generator configured to continuously generate a first clock signal whilst the positioning device is inactive;
   a second signal generator configured to discontinuously generate a second clock signal during a plurality of spaced apart time periods; and
   an accuracy determinator configured to determine the accuracy of the first clock signal using timing data from the second clock signal;
   the positioning device being arranged to determine position by use of the determined timing accuracy of the first clock, wherein the second clock signal is a system clock signal used for the communication circuitry in the mobile device.

2. The mobile device of claim 1 wherein the system comprises first timing circuitry configured to collect and store first timing data relating to the first clock signal only during the plurality of spaced apart time periods.

3. The mobile device of claim 2 wherein the first timing circuitry comprises a first counter configured to count clock edges of said first clock signal.

4. The mobile device of claim 3 wherein said first timing data is the cumulative number of clock periods of the first clock signal counted by the first counter during the plurality of spaced apart periods.

5. The mobile device of claim 4 wherein the system comprises second timing circuitry configured to collect and store second timing data relating to the second clock signal only during the plurality of spaced apart time periods.

6. The mobile device of claim 5 wherein the second timing circuitry comprises a second counter configured to count clock edges of the second clock signal.

7. The mobile device of claim 6 wherein the second timing data is the cumulative number of leading and trailing edges of the second clock signal counted by the second counter during the plurality of spaced apart time periods.

8. The mobile device of claim 7 wherein the accuracy determinator is configured to determine an accurate estimate of the length of one period of the first clock signal based on the stored first and second timing data from first and second counters.

9. The mobile device of claim 7 wherein the system comprises third timing circuitry configured to continuously collect and store third timing data relating to the first clock signal.

10. The mobile device of claim 9 wherein the third timing circuitry comprises a third counter configured to continuously count clock edges of the first clock signal.

11. The mobile device of claim 10 wherein the third timing data is the number of clock periods of the first clock signal counted by the third counter.

12. The mobile device of claim 11 wherein when the precise time is known to the positioning device, the first, second and third counters are reset, and the precise time is stored in memory.

13. The mobile device of claim 12 wherein the accuracy determinator is configured to determine an accurate estimate of the time elapsed since the first, second and third counters were last reset, based on the accurate estimate of the length of one period of the first clock signal, and the third timing data from the third counter.

14. The mobile device of claim 13 wherein the positioning device is configured to determine the current time based on the precise time stored in memory and the time elapsed since the first, second and third counters were last reset.

15. The mobile device of claim 1 wherein said positioning device is a satellite positioning system device.

16. The mobile device of claim 1 wherein the first clock signal is a sleep clock signal, generated when the mobile device is in a sleep mode of operation.

17. The mobile device of claim 1 wherein the spaced apart time periods are periods in which the mobile device receives paging information from a telecommunications network.

18. The mobile device of claim 17 wherein said telecommunications network is a global system for mobile communications (GSM) network which uses the GSM standard.

19. The mobile device of claim 17 wherein said telecommunications network is a time division multiple access (TDMA) network.

20. The mobile device of claim 17 wherein said telecommunications network is a code-division multiple access (CDMA) network.

21. The mobile device of claim 17 wherein said telecommunications network is a personal digital cellular (PDC) network.

22. A mobile device comprising a positioning device for determining position by timing analysis of received signals, the positioning device comprising a system for determining timing accuracy, the system comprising:
   first signal generating means for continuously generating a first clock signal whilst the positioning device is inactive;
   second signal generating means for discontinuously generating a second clock signal during a plurality of spaced apart time periods; and
   accuracy determining means for determining the accuracy of the first clock signal using timing data from the second clock signal;
   the positioning device being arranged to determine position by use of the determined timing accuracy of the first clock, wherein the second clock signal is a system clock signal used for the communication circuitry in the mobile device.

23. A mobile device comprising a positioning device for determining position by timing analysis of received signals, the positioning device comprising a system for determining timing accuracy, the system comprising:
   first signal generating means for continuously generating a first clock signal whilst the positioning device is inactive;
   second signal generating means for discontinuously generating a second clock signal during a plurality of spaced apart time periods; and
   accuracy determining means for determining the accuracy of the first clock signal using timing data from the second clock signal;
   first timing circuitry for collecting and storing first timing data relating to the first clock signal only during the plurality of spaced apart time periods, the first timing circuitry comprising a first counter for counting clock edges of said first clock signal, said first timing data is the cumulative number of clock periods of the first clock signal counted by the first counter during the plurality of spaced apart periods; and
   second timing circuitry for collecting and storing second timing data relating to the second clock signal only during the plurality of spaced apart time periods, the second timing circuitry comprises a second counter for counting clock edges of the second clock signal;

wherein the positioning device being arranged to determine position by use of the determined timing accuracy of the first clock.

24. A mobile device comprising a positioning device for determining position by timing analysis of received signals, the positioning device comprising a system for determining timing accuracy, the system comprising:

a first signal generator configured to continuously generate a first clock signal whilst the positioning device is inactive;

a second signal generator configured to discontinuously generate a second clock signal during a plurality of spaced apart time periods;

an accuracy determinator configured to determine the accuracy of the first clock signal using timing data from the second clock signal;

first timing circuitry configured to collect and store first timing data relating to the first clock signal only during the plurality of spaced apart time periods, said first timing circuitry comprises a first counter for configured to count clock edges of said first clock signal, said first timing data being the cumulative number of clock periods of the first clock signal counted by the first counter during the plurality of spaced apart periods; and second timing circuitry configured to collect and store second timing data relating to the second clock signal only during the plurality of spaced apart time periods, the second timing circuitry comprising a second counter configured to count clock edges of the second clock signal;

wherein the positioning device being arranged to determine position by use of the determined timing accuracy of the first clock.

25. A positioning method comprising:

continuously generating a first clock signal whilst positioning is inactive;

discontinuously generating a second clock signal during a plurality of spaced apart time periods;

determining the accuracy of the first clock signal using timing data from the second clock signal, said second clock signal being a system clock signal used for communication circuitry in a mobile device in which said positioning method is carried out;

determining position by using the determined timing accuracy of the first clock.

26. A positioning method comprising:

continuously generating a first clock signal whilst the positioning is inactive;

discontinuously generating a second clock signal during a plurality of spaced apart time periods;

determining the accuracy of the first clock signal using timing data from the second clock signal;

collecting and storing first timing data relating to the first clock signal only during the plurality of spaced apart time periods, by counting clock edges of the first clock signal, said first timing data being the cumulative number of clock periods of the first clock signal counted during the plurality of the spaced apart periods; and collecting and storing second timing data relating to the second clock signal only during the plurality of spaced apart time periods by counting clock edges of the second clock signal, whereby position is determined by use of the determined timing accuracy of the first clock.

27. A positioning device comprising a system for determining timing accuracy, the system comprising:

a first signal generator configured to continuously generate a first clock signal whilst the positioning device is inactive;

a second signal generator configured to discontinuously generate a second clock signal during a plurality of spaced apart time periods;

an accuracy determinator configured to determine the accuracy of the first clock signal using timing data from the second clock signal;

first timing circuitry configured to collect and store first timing data relating to the first clock signal only during the plurality of spaced apart time periods, said first timing circuitry comprises a first counter for configured to count clock edges of said first clock signal, said first timing data being the cumulative number of clock periods of the first clock signal counted by the first counter during the plurality of spaced apart periods; and second timing circuitry configured to collect and store second timing data relating to the second clock signal only during the plurality of spaced apart time periods, the second timing circuitry comprising a second counter configured to counting clock edges of the second clock signal;

wherein the positioning device is arranged in use to determine position by use of the determined timing accuracy of the first clock.

28. A computer program product comprising a first computer executable component configured to continuously generate a first clock signal whilst positioning is inactive;

a second computer executable component configured to determine the accuracy of the first clock signal using timing data from a second clock signal, said second clock signal being a system clock signal used for communication circuitry in a mobile device in which said computer program is executed, said second clock signal being discontinuously generated during a plurality of spaced apart time periods; and a third computer executable component configured to determine position by use of the determined timing accuracy of the first clock.

29. A computer program product comprising:

a first computer executable component configured to continuously generate a first clock signal whilst positioning is inactive;

a second computer executable component configured to discontinuously generate a second clock signal during a plurality of spaced apart time periods;

a third computer executable component configured to determine the accuracy of the first clock signal using timing data from the second clock signal;

a fourth computer executable component configured to collect and store first timing data relating to the first clock signal only during the plurality of spaced apart time periods and to count clock edges of the first clock signal, said first timing data being the cumulative number of clock periods of the first clock signal counted during the plurality of the spaced apart periods; and a fifth computer executable component configured to collect and store second timing data relating to the second clock signal only during the plurality of spaced apart time periods and to count clock edges of the second clock signal, whereby position is determined by use of the determined timing accuracy of the first clock.

* * * * *